April 5, 1932. A. BONG 1,852,732
JOINT FOR ENDLESS BANDS SUCH AS FELTS
Filed Sept. 15, 1930
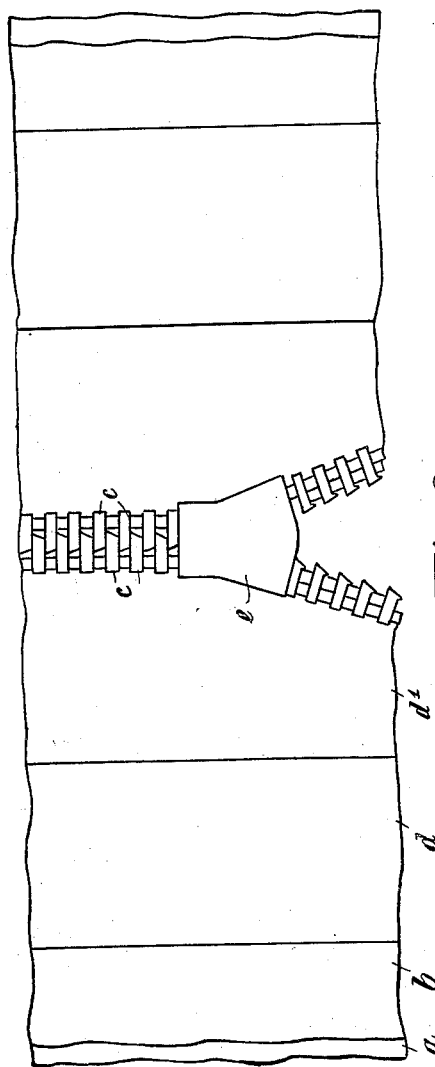
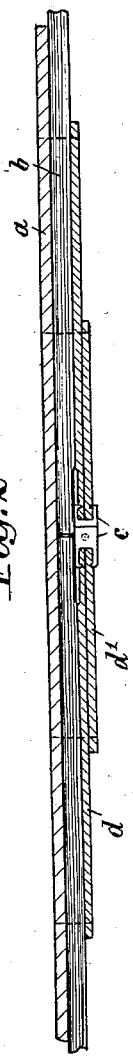
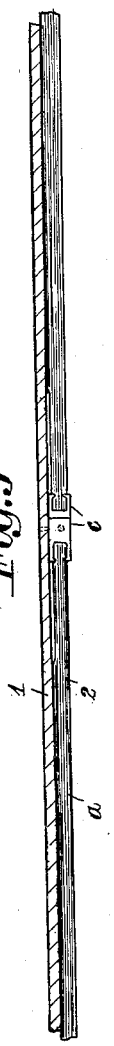
A. Bong
INVENTOR
By: Marks & Clerc
Attys.

Patented Apr. 5, 1932

1,852,732

UNITED STATES PATENT OFFICE

ADOLF BONG, OF GLOGGNITZ, AUSTRIA, ASSIGNOR TO THE FIRM AKTIENGESELLSCHAFT DER OESTERREICHISCHEN FEZFABRIKEN, OF VIENNA, AUSTRIA

JOINT FOR ENDLESS BANDS SUCH AS FELTS

Application filed September 15, 1930, Serial No. 482,037, and in Austria June 17, 1930.

This invention relates to a joint for endless bands such as drying felts as used in the manufacture of paper or the like. Such felts are mostly made endless. Such endless felts or bands entail great difficulties in transport and when being mounted on the machine. For this reason it has already been proposed to make such felts from woven or otherwise manufactured bands which are not endless and are only jointed to form an endless band at the place where they are to be used. In this case, however, the making of the joint causes great difficulties.

The present invention relates to a joint which is formed by the end of the band being connected together in the manner of a separable fastener, the arrangement being preferably such that the members of the fastener do not come to the surface or upper side of the band or felt. In this way on one side of the felt, namely on the side coming in contact with the paper, a surface can be formed which is not interrupted at the joint and which covers the fastener secured on the other side.

The use of a fastener for forming the joint makes it very easy to put a drying felt in position or to remove it, all that is required being to operate or displace the fastener (sliding member, cursor or the like).

The fastener may be fixed to bands which are attached to the under side of the felt (that is to the side of the felt which does not come in contact with the paper).

In the drawings a constructional example of the invention is shown diagrammatically, Fig. 1 being a view of the under side of the felt and Fig. 2 a cross-section. Fig. 3 shows a modified form.

The felt consists for instance of two or more layers $a, b$ of woven fabric, the connecting members of the fastener $c, c$ being so connected to the lower layer $b$ of woven fabric that the connecting members cannot come to the upper surface of the felt. The members of the fastener may be fixed to connecting pieces, such as bands $d, d_1$, which are fixed to the under side of the felt, for instance by being sewn to it.

These bands may also be formed from the felt itself. As shown in Fig. 3, the felt is woven in the manner of a double-woven fabric which at its ends is split into two separate flaps, by omitting at these ends of the fabric the binding weft threads which hold the two layers of the double-cloth together throughout the whole fabric with the exception of said ends. Thus the bottom cloth 2 will not come in contact with the paper, and serves for making the joint or for fixing the members of the fastener and the other layer of fabric 1 serving as the covering layer for the joint or for the fastener which thus cannot come to the surface of the felt.

By operating the sliding or locking member $e$ of the fastener the joint can be closed or opened.

What I claim is:

1. A joint for the ends of drying felts of paper machines comprising a fastener consisting of a multiplicity of separable interlocking parts secured to the opposite ends of the felt, a member common to the respective parts and slidable thereon to successively cause interlocking of the multiple parts and to move the ends of the felt into abutting relationship.

2. A joint for the ends of a drying felt of paper machines, said felt consisting of inner and outer layers, a fastener consisting of a multiplicity of separable interlocking parts secured to the opposed ends of the inner layer, a member common to the parts and slidable thereon to successively move the respective parts into intimate interlocking engagement and to move the ends of the inner and outer layers into abutting relationship.

In witness whereof I have hereunto signed my name.

ADOLF BONG.